Figure 1:
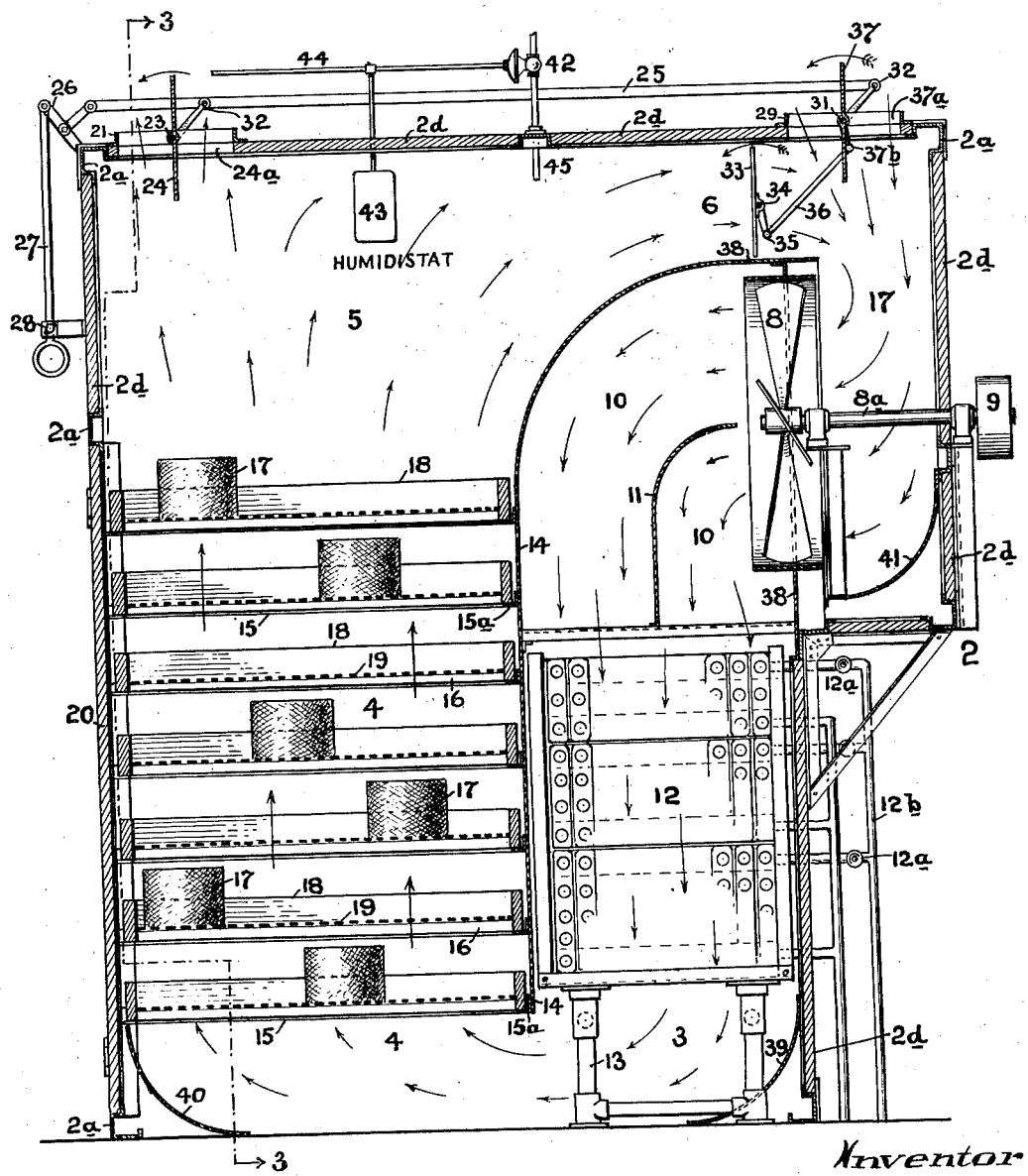

April 21, 1925.

W. G. R. BRAEMER 1,534,499

DRYING APPARATUS

Filed June 14, 1923

3 Sheets-Sheet 1

Inventor

William G. R. Braemer.

By (signature)

Attorney.

April 21, 1925.
W. G. R. BRAEMER
DRYING APPARATUS
Filed June 14, 1923
1,534,499
3 Sheets-Sheet 2
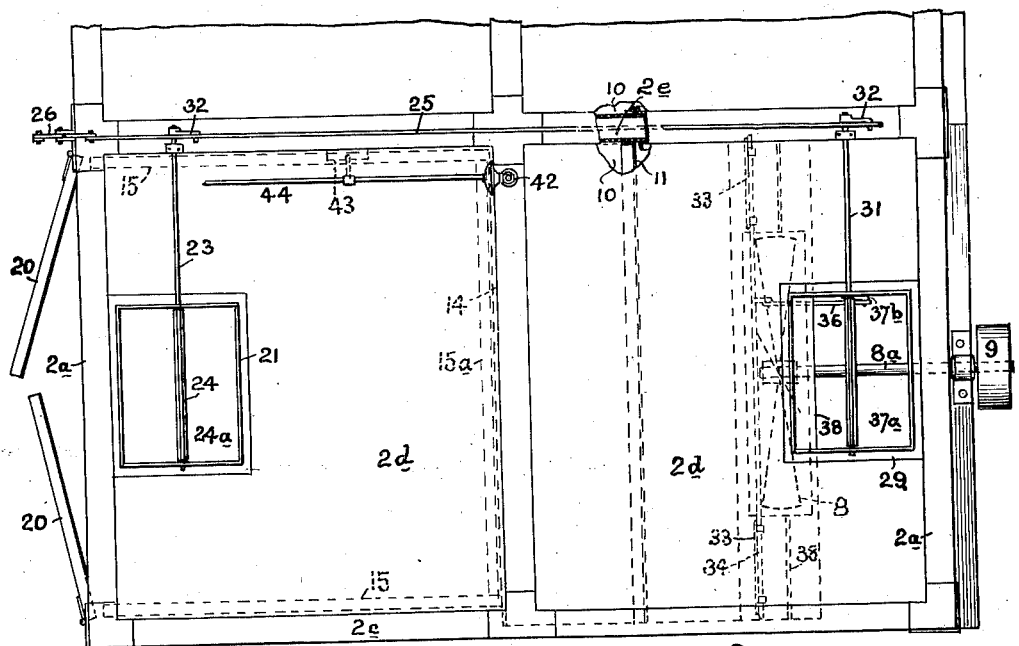
Fig. 2
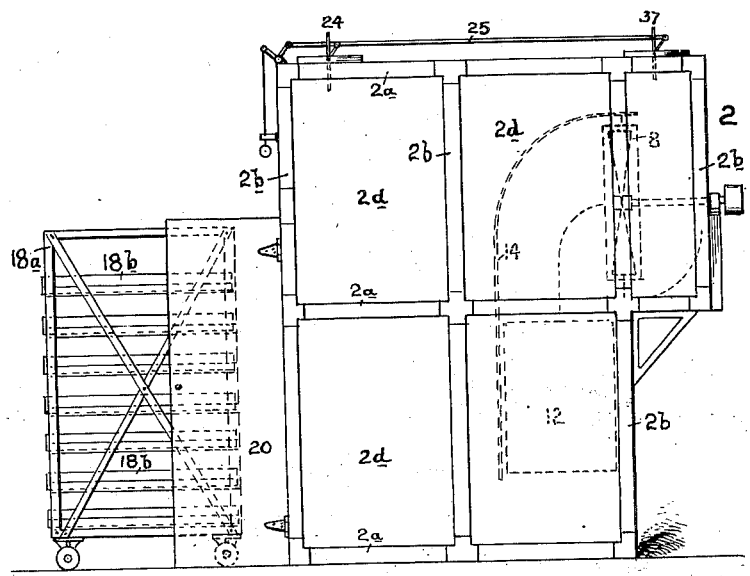
Fig. 4
Inventor
William G. R. Braemer.
By 
Attorney

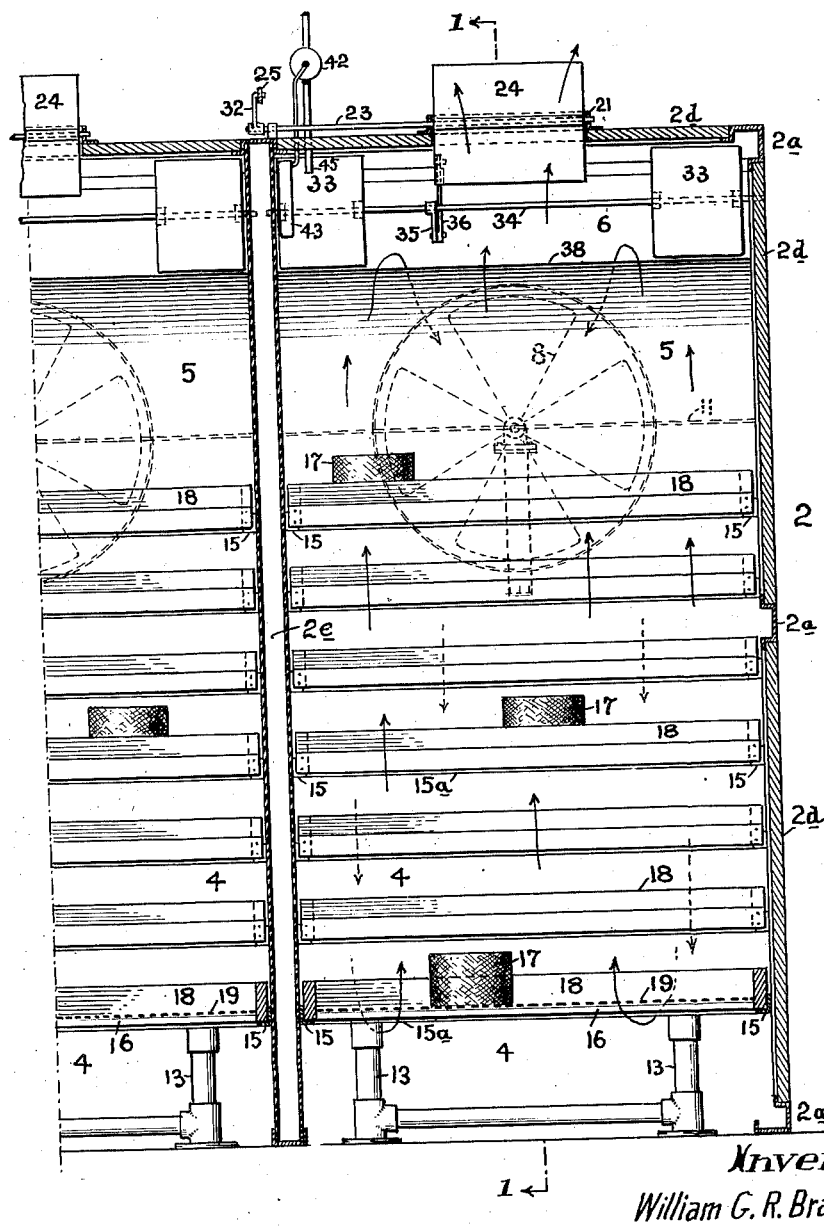

Patented Apr. 21, 1925.                                                1,534,499

UNITED STATES PATENT OFFICE.

WILLIAM G. R. BRAEMER, OF CRANSTON, RHODE ISLAND, ASSIGNOR TO GENERAL FIRE EXTINGUISHER COMPANY, A CORPORATION OF NEW YORK.

DRYING APPARATUS.

Application filed June 14, 1923. Serial No. 645,225.

*To all whom it may concern:*

Be it known that I, WILLIAM G. R. BRAEMER, a citizen of the United States, and resident of Cranston, county of Providence, and State of Rhode Island, have invented an Improvement in Drying Apparatus, of which the following is a specification.

My invention relates to drying apparatus in which heated air is circulated through or over the goods to be dried and said circulating air changed in quality when necessary by causing a gradual discharge of moisture laden air and its replacement by an equal quantity of fresh and dryer air.

My invention is especially useful for drying package goods such as "package yarn", that is, yarn specially wound in cylindrical form and adapted to be placed upon trays arranged one above the other in tiers, or otherwise in the path of the circulating air.

A special feature of my improved dryer is directed to the means for causing the maintenance of a circulating air medium of approximately uniform quality as to the extent of the moisture contained therein; and the improvement consists, in part, in the provision of a continuous open passage for recirculating the air through the apparatus, said passage containing a circulating blower or fan, and combining therewith a port and damper therefor at a distance from the blower for allowing of the discharge of moisture laden air, and a second port and damper adjacent to the suction side of the blower whereby air from outside the dryer may be drawn in and put into circulation in approximately the same proportion or quantity as that of the moist air discharged, the said dampers being supplemented by one or more restriction dampers arranged in the air passage between the discharging damper, on the one part, and the intake damper and blower, on the other part, said restriction damper functioning to produce a retarding of the air flow to the blower and thereby inducing the inflow of the fresh air to the extent required.

I further provide means common to all of the dampers whereby they are all operated simultaneously or in accord, the discharge and intake dampers opening and closing together and the obstructing damper or dampers operating inversely, so as to introduce the greatest obstruction to circulation by the blower when the discharge and intake dampers are open wide and vice versa. The areas of the obstructing dampers at no time close the air passage to the blower and their area proportion to the total area of the air passage is such that the recirculation is sufficiently free when the discharge and intake dampers are fully open that no radical change in the quality of the circulating air can take place such as would derange the uniformity desired in the quality of the circulating medium.

A further feature of the improvement is contained in the employment of a transverse diaphragm extending transversely from the axis of the blower or thereabouts and continued toward the heater, whereby the circulating air is prevented from taking on a whirling or rotary condition, and thereby is caused to spread out and pass through the heater with a rectilinear movement which it continues in its passage through the goods to be dried.

As a further improvement, the air passage within the dryer may be provided with humidity controlling means, whereby the humidity of the circulating air will be maintained to insure a predetermined percentage of moisture, such, for example, as would insure a proper regain or moisture content to the materials being dried, whether it be cotton, wool or other substance. In this manner, the material being treated may be dried only so far as to retain a proper "cotton regain" when cotton is being treated, or a proper "wool regain" when wool or woolen goods are being treated. It is evident that, if preferred, the materials may be first thoroughly dried by heated air as previously described, and thereafter subjected to an atmosphere having the proper "regain" percentage of moisture corresponding to the temperature conditions existing. In carrying out this feature of my invention, I control the admission of steam or vapor to the circulating air by the use of a humidity regulator having capacity for ratio adjustment between its wet and dry elements. It will be understood, however, that if the drying is to be only for a single substance, such as cotton, for example, then the humidity regulator need not have capacity for ratio adjustment as the relative proportioning between the wet and dry elements may be definitely fixed in the first instance for the required cotton regain.

While my invention may be employed in the form of and as a single dryer unit having outside heat insulating walls, nevertheless, in cases where greater capacity is required, I provide a construction whereby two or more dryer units may be joined and operated as a multiple unit equipment, whose capacity is adjustable to meet requirements arising from variations in quantity of materials to be dried at any one time, the improvements comprehending the omission of insulating or non-conducting intermediate division walls between adjacent drying compartments, but otherwise having the said walls proof against passage of heated air from the drying chamber of one unit to the corresponding chamber of the next adjacent unit or units.

My invention also embodies other features of improvement which, together with those above enumerated, will be better understood by reference to the drawings, in which:

Fig. 1 is a vertical section of a drying apparatus embodying my invention and taken on line 1—1 of Fig. 2; Fig. 2 is a plan view of one unit of my improved dryer; Fig. 3 is a front elevation with part in section of a multiple unit dryer, the section being taken on line 3—3 of Fig. 1; and Fig. 4 is an elevation, on a small scale, showing the use of a truck for carrying the goods to be dried in lieu of trays.

2 is the general casing or framing of the dryer apparatus and may be constructed of metal and heat insulation walls formed as panels or otherwise, following any of the approved constructions now or heretofore in use. The casing is divided by a transverse division wall 14 to provide an upright rear heating chamber 3 and forward drying chamber 4. As shown, the casing consists of pressed steel upright and horizontal frames connected together in skeleton form, 2$^b$ being the upright frames, 2$^a$ the horizontal frames, and 2$^c$ the side horizontal frames. Filling the open spaces thus formed, I provide panels 2$^d$ of metal filled with asbestos or heat insulating substance, said panels detachably fastened in place within the openings in the main frame of the casing. The doors 20, providing access to the drying chamber or compartment 4, are also formed of sheet metal filled with a non-conductor of heat, such as asbestos, said doors arranged to swing about vertical axes for controlling access to the contents of the drying chamber 4.

Secured to the upright side frames 2$^c$, I arrange horizontal angle iron guides 15, and similarly, on the rear division wall 14, I may provide other or additional corresponding angle iron guides 15$^a$, said guides providing support for removable trays 18 upon which the materials to be dried are placed. These trays 18 may have wooden sides, metal bound, and a bottom 19 of woven wire upon which the cotton spools or packages 17 are supported during the drying operation. The woven wire bottoms 19 may be secured to the sides of the tray and also be supported, if desired, upon cross bars 16 of wood, likewise secured to the sides of the tray. These trays may be made in any other suitable form, so long as a perforated or reticulated bottom is provided for free passage of air. The side angle iron guides 15 may be provided with anti-friction rollers 15$^b$ to enable the loaded trays to be more readily moved.

The rear transverse division wall 14 terminates at some distance from the bottom of the casing to provide free communication between chambers 3 and 4 for passage of heated air. The upper portion of the wall 14 is extended rearward on a curve and terminates in a transverse partition 38 having a circular opening in which a fan or blower 8 is arranged and driven by a shaft 8$^a$ and belt pulley 9. If desired, the blower or fan may be driven by an electric or other motor coupled with the shaft 9$^a$, in any suitable manner. The transverse partition 38 does not extend to the top frame or roof of the casing, but preferably terminates on a level with the extended upper curved end of the plate 14, leaving a passage 6 for air, said passage communicating on one side with the air chamber 5 above and opening into the drying chamber 4 and on the other side with a suction chamber 7 also in communication with the blower or fan 8.

The heating chamber 3 is provided with a support or stand 13 which supports the steam heating coils 12 which may be of any suitable construction. These coils may be arranged in a plurality of sets, each set supplied with steam from pipes 12$^b$ and respectively controlled by valves 12$^a$. In this manner, not only may the quantity of steam supplied to the coils be governed, but one or more of the coils may be shut off or turned on according to heating requirements.

The air blast put into circulation by the blower 8 passes downward through channels 10 and into the upper part of chamber 3 in which the heating coils are arranged. To prevent the air being put into a circular motion by the action of the blower, I provide the passage from blower to heater with a transverse plate 11, the same being upwardly extending and then curved in alinement with the axis of the blower. This construction also insures a more uniform distribution of the air to the heating coils 12. The heated air, on leaving the coils, is guided laterally from chamber 3 into drying chamber 4, immediately under the trays and package goods arranged thereon, and this circulation of the heated air is facilitated by the curved corner plates 39 and 40 reaching down to the floor level. While I have shown hand valves for controlling the steam to the coils, it will be readily understood that any of the usual means for automatic control for insuring constant temperature of the circulating air may be employed, such devices being well known and will need no special description.

Referring now to the means for controlling the flow and composition of the circulating air: 24$^a$ is a port in the roof of the casing, preferably above the drying chamber 4 and providing direct communication between the air chamber 5 and the outside atmosphere, said port being controlled by a damper 24 to regulate the passage of air through the port; and 37$^a$ is a second port in the roof of the casing and above the suction chamber 7 from which the blower sucks air to feed it to the heating coils, said port provided with a controlling damper 37 for regulating the flow of air through the port. The dampers 24 and 37 may be each provided with operating arms 32 to which is hinged a rod 25, arranged above the roof of the casing and adapted to be shifted by a bell crank 26 and an operating hand rod 27 hanging down in the front of the machine. By pulling down upon the rod 27, the dampers 24 and 37 may be closed and vice versa; and a suitable clamp or locking device 28 may be employed for retaining the dampers in their adjusted positions. It will be understood that the dampers may be adjusted to provide any desired extent of opening of the ports 24$^a$ and 37$^a$.

33 are the restricting dampers or plates and are secured at a distance apart upon the rock shaft 34 which extends transversely across the casing from side to side and located in the air passage 6 approximately above the blower 8, the respective restriction dampers being preferably arranged adjacent to the side walls of the casing as will be understood from Fig. 3. The rock shaft 34 is provided with a crank arm 35, which is connected with one end of a link 36, the other end of which is hinged to a crank arm 37$^b$ on the damper 37, the construction being such that when the dampers 24 and 37 are fully open, the restriction dampers 33 are in vertical or restricting position, as shown. In this position, the restriction dampers obstruct the passage of air through passage 6 from chamber 5 to chamber 7 (and hence to the blower) to the fullest extent and by reason of which the blower tends to produce a partial vacuum in chamber 7, causing thereby an inflow of fresh air through port 37$^a$ to co-mingle with the air being recirculated and entering chamber 7 through the passage 6. The lower part of the chamber 7 is provided with a curved wall 41 formed of bent sheet metal to direct the air currents into the blower or upward from the blower, as the case may be, according to the direction of circulation. It will also be understood that as the full air circulation is delivered into the drying chamber 4 and hence into chamber 5 and is restricted from freely passing through passage 6 to the chamber 7 for recirculation, a slight pressure is created in chamber 5, by reason of which a portion of the moisture laden air is caused to force its way through the port 24$^a$ and escape. In this way, moisture laden air is gradually eliminated from circulation and an equal quantity of fresh air is taken into the circulating air and co-mingled with it to reduce its condition as to humidity. This revitalizing of the circulating air is preferably going on continuously during the drying operation, but its extent per unit of time may be varied to suit the humid condition of the goods being dried, and the regulation being secured by the adjustment of the dampers 24, 37, to more or less closed positions, and restriction dampers 33 to more or less open (or less restricting) positions. When the dampers 24 and 37 are fully closed, the full recirculation of the same air takes place, but this should rarely be done and preferably only when quick heating of the air and goods are desired and low relative humidity present. This may also be resorted to where the goods are relatively dried to their "regain" percentage and when the recirculating air is given its definite humidity condition by special means to insure the proper "regain" condition to be impressed upon the treated goods before removal from the dryer. Under all other conditions of operation, the dampers 24 and 37 should be open to a greater or less extent, according to the amount of moisture present in the goods. In this manner, uniformity in drying may be insured; and as the use of the restriction dampers tend to increase the pressure in the chambers 4 and 5, the diffusion of the air over and through the goods is more perfect and hence the drying is more rapid and uniform.

While I have described my improved machine as operating with the air circulating upwardly through the drying chamber and trays, it is to be understood that it may be operated in a reverse direction or alternately in opposite directions. When reversed in operation to that described, the blower forces the humid air into the chamber 7, increasing the pressure therein and reducing the pressure in the lower part of the drying chamber and even into the chamber 5, to cause an intake of fresh air through port 24ª, while causing discharge of humid air from port 37ª. This reversal in the flow of the air through the drying chamber increases the speed of drying and at the same time insures a more uniform drying. The differential in pressures above and below the trays, when filled with goods (such as in package form), is a material factor in insuring circulation; and as this differential is greatest when the trays are most full and offering the greatest resistance to the air current, it is manifest that when working at capacity, it is desirable to reverse the direction of the air current at intervals to insure the greatest output with uniform drying. In this case of reversed flow, the restriction dampers 33 perform the same function as before in insuring a discharge of humid air and intake of fresh air to maintain the circulating air at the desired relative humidity for effective drying, but the port 24ª now acts as the intake port and port 37ª as the outlet or discharge port.

The doors 20 to the drying chamber 4 are located upon the opposite side of the casing to where the blower and heating coils are located and in this manner the width of the casing is reduced to a minimum and all of the operative parts are easy of access, and furthermore, facilitate the association of a plurality of units, two of which are shown in Fig. 3. When combining two or more units, the adjacent sides are connected by a box-shaped intervening wall 2ᵉ having a closed air chamber and providing continuous side walls to the drying chambers 4 and air chamber 5 above them and acting as supports for the tray guides 15. In this case no insulating panels will be used between the adjacent dryer units and yet the hollow air chambered wall acts as a non-conductor of heat in an efficient manner.

It will be observed that the cubical space for air within the casing is relatively very great as compared to the space occupied by the package goods and constituting the drying chamber 4 occupied by said goods, consequently the air volume being circulated is relatively large as compared to the space occupied by the goods and the resulting drying is more uniform and efficient. This result, in view of the fact that air volume as compared to the moisture content of the goods is relatively great and the proportion of discharged air and fresh air required relatively to the total circulating air is small.

While it is possible to regulate the percentage of humidity in the circulating air by hand, to secure a final treatment of the goods and insure therein the proper "regain", I prefer to employ automatic means for this purpose. To accomplish this result, I provide a humidostat, such as 43, in the air chamber 5 or other suitable space through which the air circulates, the response of which humidostat or regulator to the humidity changes of the circulating air controls the motor valve 42 for admitting steam vapor from nozzle 45 whenever the humidity falls below that required. 44 is an air pressure pipe for supplying compressed air for actuating the motor valve 42, the humidostat 43 controlling a relief valve in the usual manner to permit the building up of an air pressure in the motor valve 42 to operate it. The humidostat 43 may be of a type for controlling relative humidity simply, or, if provided with wet and dry elements having capacity for ratio adjustment, then the instrument may be set for insuring the maintenance of humidity percentage corresponding to the proper "regain" for cotton, wool, etc., as may be required under the process of drying. In this case, the humidostat may be employed continuously or cut out, and hand regulation by the dampers employed until the drying is nearly completed and then the relatively dry air brought to the proper "regain" humidity condition in finishing up the drying.

A humidostat, such as above referred to, is set out in Letters Patent No. 1,481,251, dated January 22, 1924, and to which reference is made for a more full understanding of a device of this character. As humidostats are well known in the art of air treatment in which humidity conditions are automatically controlled, reference is made to the aforesaid patent by way of example of a suitable humidostat and not by way of restriction, as any of the humidostats heretofore in use may be adapted to the requirements of the present invention.

As shown in Fig. 1, the package goods 17 are supported on trays 18, but instead, the said goods may be supported on shelves or trays 18ᵇ of a truck 18ª and the truck moved into and out of the drying chamber when required, as will be understood by reference to Fig. 4. I, therefore, do not limit or restrict myself as to how the package goods are sustained in the drying chamber 4.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:

1. In a drying apparatus, a casing divided into a vertical heating chamber and a vertical drying chamber arranged side by side and having direct communication at one end, said casing also having an auxiliary air chamber in communication with the other end of the drying chamber and indirectly in communication with the corresponding end of the heating chamber, combined with heating coils arranged in the heating chamber, an air circulating blower for circulating the air through the heating coils and heating chamber and also through the drying chamber in a continuous manner, means adjacent to the blower for providing communication between the atmosphere and interior of the casing, means adjacent to the drying chamber for providing communication between the atmosphere and the interior of the casing, additional means within the casing for restricting the freedom of flow of the circulating air between the blower and drying chamber, said means located within the casing at a point between the respective means for providing communication between the atmosphere and the interior of the casing, and means for regulating the extent of the communication between the atmosphere and the interior of the casing and also for varying the extent of the restriction to the flow of the circulating air between the blower and the drying chamber.

2. The invention according to claim 1, wherein the restricting means comprises an adjustable damper arranged in the air passage and having an area greatly less than the cross sectional area of said passage.

3. The invention according to claim 1, wherein the restricting means comprises a transverse shaft having thereon two widely separated restricting damper plates whose combined area is less than one-half of the whole cross sectional area of the air passage in which they are located and through which the air to be controlled passes.

4. The invention according to claim 1, wherein the separate means for controlling communication between the atmosphere and the interior of the casing and the restricting means within the casing are all mechanically connected and simultaneously adjustable whereby when the communication between the atmosphere and the interior of the casing is reduced, the extent of restriction to the circulating air within the casing is also simultaneously reduced, and vice versa.

5. The invention according to claim 1, wherein the several means for insuring communication between the atmosphere and the interior of the casing are respectively provided with controlling dampers and the restricting means also formed as a damper, and wherein further, operating means is provided connecting the several dampers whereby they are simultaneously operated.

6. The invention according to claim 1, wherein the casing is provided with means for admitting moisture into the circulating air, and controlling means for regulating the admission of moisture comprising valve devices for directly controlling the moisture, and a humidostat arranged within the casing for controlling the operation of the valve devices.

7. The invention according to claim 1, wherein the drying chamber is provided with doors on the side opposite to the heating chamber, and removable supporting means for the material to be dried are arranged across the chamber one above the other, and wherein further, the means for controlling the communication between the atmosphere and the interior of the casing, and also the means for restricting the circulation of the air, together with the blower, are arranged at the upper part of the casing, and in which further, the blower is arranged below the restricting means and a transverse diaphragm is arranged across the casing from above the blower downwardly and in communication with the division wall between the heating chamber and drying chamber and forming the communication between the blower and the upper part of the heating coils.

8. In a drying apparatus, a casing having a vertical division of less than the full height of the casing and dividing it into a vertical heating chamber and vertical drying chamber, said chambers in direct communication at the bottom and in indirect communication at the top, and further provided with doors on the side of the drying chamber opposite to the heating chamber, combined with suitable means for supporting the goods to be dried within the heating chamber, a blower intermediate of the communication between the upper parts of the drying chamber and heating chamber, heating coils within the heating chamber, damper means in the casing above the drying chamber and the passage leading to the blower for controlling communication between the atmosphere and the interior of the casing, and means in the communicating passage between the blower and the drying chamber and also located between the two dampers for controlling communication with the atmosphere whereby the circulation of air between the dryer and blower may be restricted by varying the resistance to its flow under the influence of the blower.

9. The invention according to claim 8, wherein further, the division between the drying and heating chambers extends transversely across the casing and is curved at its upper part above the drying chamber and reaching to and above the top of the blower and terminating at a distance from the upper or roof part of the casing to provide a passage in which the restricting damper is arranged, and in which further, an upright transverse diaphragm is arranged within the casing and extending approximately from the center of the blower downward toward the heating coils for providing a plurality of passages between the blower and the heating coils to prevent the air from being rotated.

In testimony of which invention, I hereunto set my hand.

WM. G. R. BRAEMER.